Patented Aug. 26, 1952

2,608,575

UNITED STATES PATENT OFFICE 2,608,575

IMINO-SUBSTITUTED ESTERS OF DITHIO-CARBAMIC ACIDS

Roger A. Mathes, Akron, Ohio, assignor to The B. F. Goodrich Company, New York, N. Y., a corporation of New York No Drawing. Application January 28, 1950, Serial No. 141,167

4 Claims. (Cl. 260—455)

This invention relates to a new class of chemical compounds useful as accelerators for the vulcanization of natural and synthetic rubbers and for various other purposes, and pertains more specifically to novel dithiocarbamic acid derivatives and a method of making the same.

The compounds of this invention are imino-substituted esters of dithiocarmabic acids, which possess the general formula:

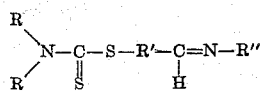

where

represents the radical derived by removing hydrogen from an amine having at least one hydrogen connected to the amine nitrogen, R' represents a bivalent hydrocarbon group preferably of 1 to 6 carbon atoms and R'' represents hydrogen or a hydrocarbon group preferably of 1 to 12 carbon atoms.

These imino-substituted esters of dithiocarbamic acids are conveniently and readily prepared by first reacting a salt of a dithiocarbamic acid with a halo-aldehyde to form, by metathesis, a dithiocarbamyl aldehyde and then reacting the dithiocarbamyl aldehyde with ammonia or a primary amine to form, by splitting out of one molecule of water, the desired imino derivative of the dithiocarbamic acid  These reactions can be illustrated by the following reaction equations where

R' and R'' have the significance as described above, X represents a halogen atom and M represents the cation of the dithiocarbamic acid salt:

(1)
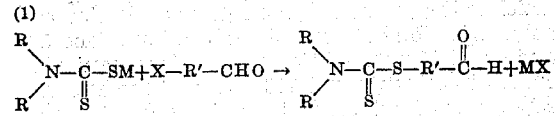

(2)
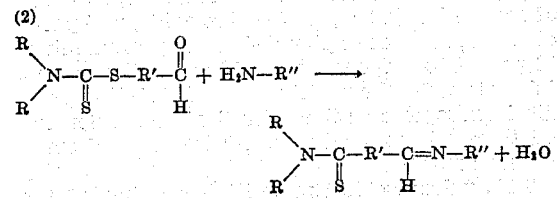

Reactions 1 and 2 are both spontaneous and exothermic and will proceed at room temperature. Reaction (1) is sufficiently exothermic to require cooling for best results, but, reaction (2), while also exothermic, does not proceed at such a rate as to require cooling. In fact, without any external cooling during reaction (2) the temperature of the reaction mixture increases only about 2° C. to 5° C. over the entire reaction period.

Any salt of a dithiocarbamic acid can be employed as a reactant in the preparation of the compounds of this invention, but the water-soluble salts such as the alkali metal and ammonium salts are preferred as reactants because of the fact that they yield water-soluble inorganic halide salts as by-products in reaction (1), which salts can be easily separated from the water-insoluble organic product of the reaction. The ammonium, sodium and potassium dithiocarbamates are the most preferred water-soluble salts because of their availability and economy of preparation. Salts of dithiocarbamic acids are ordinarily and most conveniently prepared by reacting carbon disulfide with a primary or secondary amine in the presence of a salt forming alkaline material, and use of the relatively inexpensive sodium, potassium or ammonium hydroxide as the alkaline material is desirable; hence the dithiocarbamic acid is generally obtained in the form of a sodium, potassium or ammonium salt.

The $$\begin{array}{c} R \\ \diagdown \\ N- \\ \diagup \\ R \end{array}$$

radical of the general formula hereinbefore set forth is that part of the dithiocarbamate which is derived from the amine employed in preparing the salt of dithiocarbamic acid. Accordingly, the dithiocarbamates which can be employed as reactants include, among others, those derived from the reaction of carbon disulfide with such primary amines as methyl amine, ethyl amine, n-propyl amine, isopropyl amine, n-butyl amine, amyl amines, lauryl amine, cyclohexyl amine, aniline, and naphthyl amine, as well as those derived from the reaction of carbon disulfide with such secondary amines as dimethyl amine, diethyl amine, di-n-propyl amine, diisopropyl amine, dibutyl amines, diamyl amines, dicyclohexyl amine, ethyl cyclohexyl amine, ethyl amyl amine, morpholine, piperidine, diphenyl amine, ethyl aniline, di-(beta-naphthyl) amine, etc.

Specific dithiocarbamates derived from these amines are for example sodium ethyl dithiocarbamate, sodium dimethyl dithiocarbamate, sodium N-methyl N-cyclohexyl dithiocarbamate, sodium N-cyclopentamethylene dithiocarbamate (derived from piperidine), sodium N-cyclo-ethylene-oxyethylene dithiocarbamate (derived from morpholine), sodium phenyl dithiocarbamate, sodium o-tolyl dithiocarbamate, sodium dicyclohexyl dithiocarbamate, and sodium diphenyl dithiocarbamate.

Typical halo-aldehydes having the formula

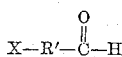

where R' is a divalent hydrocarbon radical, which are useful as reactants in preparing the compounds of this invention are, for example, bromoacetaldehyde, chloroacetaldehyde, 2-chloropropionaldehyde, 1-chloropropionaldehyde, 1-bromopropionaldehyde, 2 - iodopropionaldehyde, 1-chlorobutyraldehyde, 2-chlorobutyraldehyde, 1-bromobutyraldehyde, 2 - bromobutyraldehyde, 1-chloroisobutyraldehyde, 1-bromovaleraldehyde, 3 - chlorovaleraldehyde, 1 - bromocapraldehyde, 1-chloroheptaldehyde, p-chlorocyclohexane carboxaldehyde, o-, m- or p-chlorobenzaldehyde, o-, m- or p-bromobenzaldehyde, 5-chloro-o-tolualdehyde, 2-chloro-p-tolualdehyde, and p-bromophenyl acetaldehyde, among others.

The R''NH₂ reactant used in reaction (2) in the preparation of the compounds of this invention is, for example, ammonia (where R'' is hydrogen), or any unsubstituted primary amine including methyl amine, ethyl amine, propyl amine, isopropyl amine, butyl amine, isobutyl amine, beta, beta'-dimethylbutyl amine, beta-ethylbutyl amine, sec.-butyl amine, tert.-butyl amine, amyl amine, isoamyl amine, sec.-amyl amine, tert.-amyl amine, hexyl amine, cyclohexyl amine, octyl amine, lauryl amine, aniline, o-, m-, p-toluidine naphthyl amines and phenethyl amine among others.

The reactions yielding the compounds of this invention can be carried out in the presence or absence of a solvent or diluent. The use of a reaction diluent is preferred, since this provides a convenient means for removal of the heat liberated by reaction (1). The use of an aqueous solution of a wetting agent as medium for the reaction is especially desirable in that the product is thereby obtained in earlier-handled form. Other solvents or diluents which are commonly employed in the synthesis of organic compounds such as liquid alcohols, ethers, hydrocarbons and chlorinated hydrocarbons may also be employed in the preparation of the compounds of this invention.

The following Example I sets forth complete details of the preparation of 2-(phenylimino)-ethyl N,N-dimethyl dithiocarbamate and is given to illustrate a preferred general method of preparing the various members of the new class of compounds of this invention. The term "parts" as employed in the examples which follow is used to indicate parts by weight.

EXAMPLE I

An aqueous solution containing 72 parts of sodium dimethyldithiocarbamate and 0.2 part of a wetting agent (known commercially as "Nekal AEM" and believed to be a mixture of gelatin and sodium isobutyl naphthylene sulfonate) dissolved in 400 parts of water was added at room temperature to a reactor equipped with a stirrer, a reflux condenser and a charging line. The aqueous solution was stirred while 44 parts of chloroacetaldehyde dissolved in 100 parts of water were slowly added to the reactor over a period of about 70 minutes. As soon as the addition of chloroaldehyde was started a reaction began as was evidenced by a rise in temperature of the reaction mixture. The reaction mixture was maintained at about 25° C. to 30° C. by external cooling. The product of the reaction, dimethyldithiocarbamyl acetaldehyde, formed as a precipitate of fine crystals.

To the mixture prepared above there was then added with continued stirring but without external cooling, 46.5 parts of aniline whereupon the temperature rose about 2° C. This mixture was stirred for about 20 minutes to complete the reaction. The coarse precipitate which had then formed was filtered from the reaction medium, washed with water and dried. In this manner 111 parts, a 90% yield, of a fine buff-colored powder melting at 67–72° C., identified as 2-(phenylimino)-ethyl N,N-dimethyl dithiocarbamate, was obtained.

The following Examples II and III, employing the product of Example I, illustrate the use of the

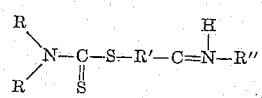

compounds of this invention to accelerate the vulcanization of natural and synthetic rubbers.

EXAMPLE II

A vulcanizable composition was prepared by thoroughly mixing together 100 parts of natural crude rubber, 50 parts of carbon black, 5.0 parts of zinc oxide, 3 parts of sulfur, 3.5 parts of stearic acid, 3.0 parts of pine tar softener, 1.0 part of an aryl amine antioxidant, and 0.5 part of 2-(phenylimino)-ethyl N,N-dimethyldithiocarbamate as the vulcanization accelerator. This mixture was heated in a press for 45 minutes at 280° F. Test strips of the resulting vulcanizate were subjected to stress-strain tests. In this manner it was determined that the vulcanized rubber composition had a tensile strength of 1125 lbs./sq. in. at 400% elongation, an ultimate tensile strength of 2800 lbs./sq. in. and an elongation of 630% at break. A rubber composition containing the same ingredients with the exception of the imino dithiocarbamate and containing no other accelerator would undergo only incipient vulcanization after being heated for 45 minutes at 280° F.

EXAMPLE III

A vulcanizable composition was prepared containing the synthetic rubber known as GR–S, which is the product of the aqueous emulsion copolymerization of about 75 parts of butadiene-1,3 and about 25 parts of styrene. This vulcanizable composition contained 100 parts of the rubbery copolymer of butadiene-1,3 and styrene, 50 parts of carbon black, 2.5 parts of zinc oxide, 2.25 parts of sulfur, 1.0 part of phenyl-beta-naphthylamine, 10 parts of a terpene resin acid as a softener, and 1.5 parts of 2-(phenylimino)-ethyl N,N-dimethyldithiocarbamate as the vulcanization accelerator all thoroughly mixed together to form a homogeneous mass.

This vulcanizable composition was heated for 75 minutes in a press at 280° F. and stress-strain tests were carried out on test strips of the resulting vulcanizate. In this manner it was determined that this vulcanizate had an ultimate tensile strength of 2000 lbs./sq. in. and an elongation at break of 850%. A similar vulcanizable composition containing the same ingredients with the exception of the imino dithiocarbamate accelerator and containing no other accelerator would exhibit no appreciable vulcanization when heated for 75 minutes at 280° F.

From the results of the use of 2-(phenylimino)-ethyl N,N-dimethyldithiocarbamate in Examples II and III, it is apparent that the dithiocarbamic acid derivatives of this invention are useful accelerators of the sulfur vulcanization of rubbery materials.

These new dithiocarbamic acid derivatives can be employed to accelerate the sulfur vulcanization of any of the various polymeric organic rubbery materials including, especially, natural and synthetic rubbery polymers of conjugated dienes. Examples of such organic rubbery polymers include the various natural crude rubbers (which are regarded as naturally-occurring isoprene polymers) and such synthetic polymeric organic rubbery materials as polymers of conjugated diene hydrocarbons such as butadiene-1,3, isoprene, 2-methyl butadiene-1,3, and other butadiene-1,3 hydrocarbons, chloroprene, and 3 cyano butadiene-1,3 as well as copolymers of these conjugated dienes with each other or with other unsaturated compounds copolymerizable therewith such as styrene, isobutylene, acrylonitrile, methyl acrylate, methyl methacrylate, vinylidene chloride, etc.

In general an amount of 0.1% to 5% by weight, based on the rubbery polymer, of these iminosubstituted dithiocarbamates will be sufficient to accelerate the vulcanization of rubbery compositions containing 0.5% to 5% by weight of sulfur. Such compositions can be vulcanized by heating at the ordinary vulcanization temperatures for the usual length of time.

The new imino-substituted dithiocarbamates of this invention can also be employed as the active ingredients in insecticidal and fungicidal compositions. They can also be used as intermediates in the synthesis of other organic chemical compounds.

The following Examples IV to X set forth in tabular form in the table relate to other specific members of this new class of dithiocarbamates. The reactants employed to prepare each compound are listed with the compound. The procedural method of preparation is that described in Example I. Each of the compounds listed in the table is effective as an accelerator of vulcanization of natural and synthetic rubbers when tested as described in Examples II and III.

*Table*

| Example | Dithiocarbamate | Reactants Halo-Aldehyde | R—NH$_2$ Compound | Product (Imino-substituted Esters of Dithiocarbamic Acid) |
|---|---|---|---|---|
| IV | (CH$_3$)$_2$—N—C(=S)—SNa | ClCH$_2$CHO | NH$_3$ | (CH$_3$)$_2$N—C(=S)—S—CH$_2$CH=NH <br> 2-Imino-ethyl N,N-dimethyl dithiocarbamate |
| V | C$_2$H$_5$NH—C(=S)—SNa | BrCH$_2$CHO | H$_2$NC$_2$H$_5$ | C$_2$H$_5$NH—C(=S)—S—CH$_2$CH=NC$_2$H$_5$ <br> 2-(Ethylimino)-ethyl N-ethyl dithiocarbamate |
| VI | Cyclohexyl-NHC(=S)—SNa | ClCH$_2$CH$_2$CHO | H$_2$N—CH(CH$_3$)—CH$_3$ | Cyclohexyl-NHC(=S)—S—CH$_2$CH$_2$CH=N—CH(CH$_3$)CH$_3$ <br> 3-(isopropylimino)-propyl N-cyclohexyl dithiocarbamate |
| VII | (C$_6$H$_5$)$_2$N—C(=S)—SNa | Br—C(CH$_3$)$_2$—CHO | H$_2$N—C$_6$H$_{13}$ | (C$_6$H$_5$)$_2$NC(=S)—S—C(CH$_3$)$_2$—CH=N—C$_6$H$_{13}$ <br> 1,1-Dimethyl-2-(hexylimino)-ethyl N,N-diphenyl-dithiocarbamate |
| VIII | (CH$_3$)$_2$NC(=S)—SNa | Cl—CH(C$_4$H$_9$)—CHO | H$_2$NC$_6$H$_5$ | (CH$_3$)$_2$NC(=S)—S—CH(C$_4$H$_9$)—CH=N—C$_6$H$_5$ <br> 1-(n-Butyl)-2-(phenylimino)-ethyl N,N-dimethyl-dithiocarbamate |
| IX | (C$_6$H$_{12}$)(CH$_3$)NC(=S)—SNa | Cl-(4-formylcyclohexyl) | H$_2$NCH$_3$ | (C$_6$H$_{12}$)(CH$_3$)NC(=S)—S—(cyclohexyl)—CH=N—CH$_3$ <br> 4-(Methyliminomethyl)-cyclohexyl N-cyclohexyl-N-methyl dithiocarbamate |
| X | (C$_6$H$_5$)(C$_2$H$_5$)NC(=S)—SNa | Cl—C$_6$H$_4$—CHO | H$_2$N—cyclohexyl | (C$_6$H$_5$)(C$_2$H$_5$)NC(=S)—S—C$_6$H$_4$—CH=N—cyclohexyl <br> p-(cyclohexyliminomethyl)-phenyl N-phenyl-N-ethyl-dithiocarbamate |

It will be understood that the other dithiocarbamates, haloaldehydes and primary amines hereinbefore set forth can also be employed as reactants in preparing still other compounds of the class of this invention. These reactants may be employed as described in Example I and the desired product also can be recovered as therein described.

In Example I, the ratio of reactants was substantially equimolecular for all three reactants. It is not critical that this ratio of reactants be employed, but rather any suitable ratio of reactants can be used. These and other changes and modifications in the method of preparation and in the resulting product will occur to those skilled in the art and are within the spirit and scope of my invention as defined in the appended claims.

I claim:

1. A compound having the formula

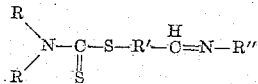

wherein

represents the radical derived by removing hydrogen from an amine having at least one hydrogen connected to the amine nitrogen, R' represents a bivalent hydrocarbon group of 1 to 6 carbon atoms and R'' represents a member selected from the group consisting of hydrogen and hydrocarbon radicals containing 1 to 10 carbon atoms.

2. 2-(phenylimino)-ethyl N,N-dimethyldithiocarbamate having the formula

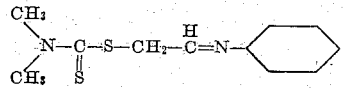

3. The method of preparing an imino-substituted ester of a dithiocarbamic acid which comprises reacting in solution a water-soluble salt of a dithiocarbamic acid having the formula

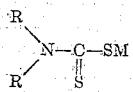

the radical

represents the radical derived by removing hydrogen from an amine having at least one hydrogen connected to the amine nitrogen and M is the cation of this water-soluble dithiocarbamic acid salt, with a haloaldehyde containing no olefinic unsaturation to form a dithiocarbamyl aldehyde, and then reacting in solution the dithiocarbamyl aldehyde with a compound selected from the class consisting of ammonia and primary amines.

4. The method of preparing 2-(phenylimino)-ethyl dimethyldithiocarbamate which comprises reacting in an aqueous medium sodium dimethyl dithiocarbamate with chloroacetaldehyde to form dimethyl dithiocarbamyl-acetaldehyde, and then reacting in an aqueous medium the dimethyl dithiocarbamyl-acetaldehyde with aniline.

ROGER A. MATHES.

REFERENCES CITED

The following references are of record in the file of this patent:

UNITED STATES PATENTS

| Number | Name | Date |
|---|---|---|
| 2,146,669 | Cramer | Feb. 7, 1939 |
| 2,496,941 | Hardman | Feb. 7, 1950 |